(12) United States Patent
Godlien

(10) Patent No.: US 8,308,958 B2
(45) Date of Patent: Nov. 13, 2012

(54) FLUID CLARIFICATION SYSTEM, METHOD, AND APPARATUS

(76) Inventor: Scott Blair Godlien, Cochrane (CA)

( * ) Notice: Subject to any disclaimer, the term of this patent is extended or adjusted under 35 U.S.C. 154(b) by 0 days.

(21) Appl. No.: 13/115,247

(22) Filed: May 25, 2011

(65) Prior Publication Data

US 2011/0253635 A1    Oct. 20, 2011

Related U.S. Application Data

(62) Division of application No. 11/756,610, filed on May 31, 2007, now Pat. No. 7,972,501.

(30) Foreign Application Priority Data

Nov. 27, 2006  (CA) .................................. 2568943

(51) Int. Cl.
*B01D 21/02* (2006.01)
*B01D 21/08* (2006.01)

(52) U.S. Cl. ........ 210/800; 210/709; 210/801; 210/521; 210/522

(58) Field of Classification Search ............... 210/709
See application file for complete search history.

(56) References Cited

U.S. PATENT DOCUMENTS

| | | |
|---|---|---|
| 653,009 A | 7/1900 | Koyl |
| 2,799,645 A | 7/1957 | Musgrove |
| 4,054,514 A | 10/1977 | Oltmann |
| 4,056,477 A | 11/1977 | Ravitts |
| 4,226,714 A | 10/1980 | Furness et al. |
| 4,247,312 A | 1/1981 | Thakur et al. |
| 4,388,195 A | 6/1983 | von Hagel et al. |
| 4,536,286 A | 8/1985 | Nugent |
| 4,636,308 A | 1/1987 | Summers |
| 5,145,256 A | 9/1992 | Wiemers et al. |
| 5,582,727 A | 12/1996 | Foster |
| 5,605,636 A | 2/1997 | Wyness |
| RE35,668 E | 11/1997 | Albertson |
| 5,833,868 A | 11/1998 | Bajema |
| 5,904,855 A | 5/1999 | Manz et al. |
| 5,944,995 A | 8/1999 | Sethi et al. |
| 6,010,631 A | 1/2000 | Delsalle et al. |
| 6,059,977 A | 5/2000 | Rowney et al. |
| 6,110,382 A | 8/2000 | Wiemers et al. |
| 6,391,195 B1 | 5/2002 | Layton |
| 6,482,320 B2 | 11/2002 | Kosanda et al. |
| 6,506,310 B2 | 1/2003 | Kulbeth |
| 6,554,141 B2 | 4/2003 | Carriere |
| 6,793,814 B2 | 9/2004 | Fout et al. |
| 6,849,190 B2 | 2/2005 | Abu-Orf |
| 6,863,809 B2 | 3/2005 | Smith et al. |
| 6,936,178 B2 | 8/2005 | Peloquin et al. |
| 7,083,050 B2 | 8/2006 | Nyman et al. |
| 7,083,715 B2 | 8/2006 | Binot |
| 7,160,474 B2 | 1/2007 | Harding |
| 7,527,726 B2 | 5/2009 | Slough et al. |
| 7,824,549 B2 | 11/2010 | Wilcher et al. |
| 7,972,501 B2 | 7/2011 | Godlien |
| 7,972,518 B2 * | 7/2011 | Ralph et al. .................... 210/710 |

* cited by examiner

*Primary Examiner* — Tony G Soohoo
*Assistant Examiner* — Peter Keyworth
(74) *Attorney, Agent, or Firm* — Sheridan Ross P.C.

(57) ABSTRACT

A fluid clarification system and method is described in which fluid is passed through one or more settling compartments, each having a solids outlet at the base of the compartment. The base of each compartment includes inclined surfaces for guiding settled solids to the outlet. Also described is a polymer reaction trough including baffles to promote gentle mixing of inflow fluid with flocculant. The system is designed to reduce costs of transportation, flocculant, and solids handling. The system is preferably arranged to facilitate transport on a skid or trailer, while maximizing fluid handling capabilities and minimizing costs.

15 Claims, 6 Drawing Sheets

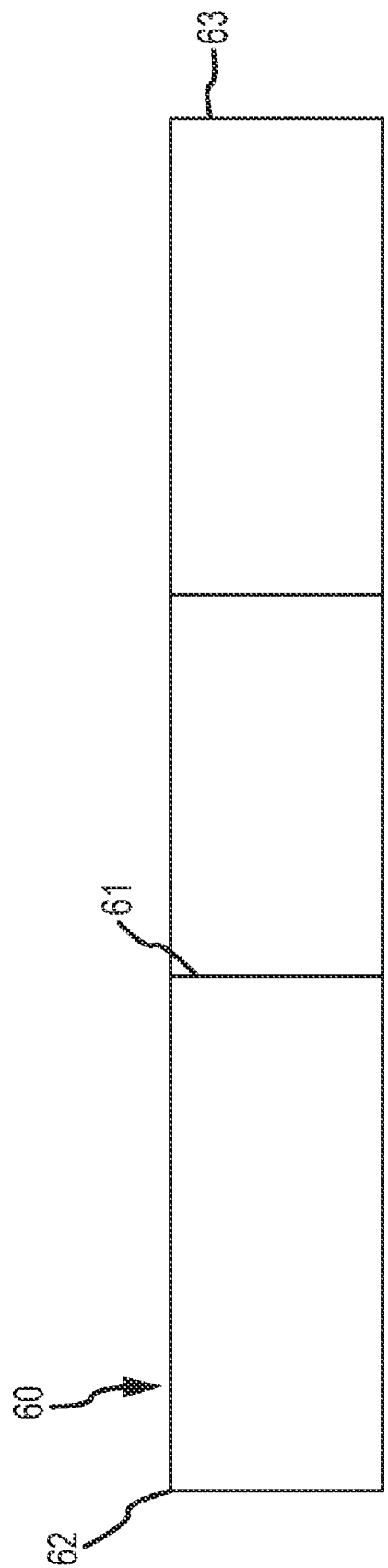

FLUID CLARIFICATION SYSTEM, METHOD, AND APPARATUS

REFERENCE TO RELATED APPLICATIONS

This application is a divisional of U.S. patent application Ser. No. 11/756,610, now U.S. Pat. No. 7,972,501, which was filed on May 31, 2007 and is hereby incorporated in entirety by reference.

FIELD OF THE INVENTION

The present invention relates generally to the clarification of fluids. More particularly, the present invention relates to a system, method, and apparatus for separating suspended solids from a fluid stream to produce a clarified fluid stream and a solids output stream.

BACKGROUND OF THE INVENTION

Downhole drilling operations are generally performed at remote locations, and it is therefore desirable to reuse or recycle as many resources as possible on-site to avoid excessive environmental damage and reduce unnecessary transportation costs. In addition, any other means to reduce equipment, material, and transportation costs is desirable.

During clearwater drilling, water is pumped downhole through the drill string to the drill bit, and is returned to the surface as a slurry, carrying cuttings and suspended solids. The slurry is then clarified and the resulting clear water is recycled for use in further drilling. At various stages of drilling, different drilling fluid compositions are required, and it is preferable that each fluid is similarly clarified and recycled to conserve resources and minimize environmental damage.

In typical drilling systems, used drilling fluid is clarified using a combination of screening, shakers, hydrocyclones, settling tanks, centrifuges, and flocculating agents. In systems incorporating primarily gravity-based settling means, a horizontal settling tank system may be used to provide a long flowpath for passage of the fluid, maximizing fluid retention time within the system and providing sufficient opportunity for solids to settle from the fluid. Once the fluid stream has passed through the entire system, solids have settled at the bottom of the tank, and the drilling fluid has been sufficiently clarified that it may be reused downhole.

Over time, settled solids build up in the tank compartments and must be removed to maintain the quality of the clarified output fluid. Various prior art systems employ solids conveying systems to transport solids from the bottom of the settling compartments to the end or top of the tank for disposal exterior the system. For example, U.S. Pat. No. 6,059,977 teaches the use of an auger system for conveying the solids through the bottom of each tank compartment to an outlet port; U.S. Pat. No. 6,863,809 teaches pumping of solids through collection pipes to a centrifuge; and U.S. Pat. No. 6,391,195 teaches the use of a drag conveyor for transporting solids from the bottom of the solids tank upwardly to an outlet higher in elevation than the tank contents. Such solids removal systems involve mechanical parts which require maintenance and may also become clogged or jammed with solids during use. Moreover, the prior art tank systems are difficult to empty and clean following completion of drilling.

An additional objective of some fluid clarification systems is to concentrate or thicken the solids stream for disposal directly on the ground on-site. This generally requires a series of centrifuges to dewater the solids stream, as selective removal of thickened solids from the settling tank is not possible. As centrifuges are expensive to operate, requiring regular maintenance as well as consuming significant amounts of energy, it is desirable to minimize the use of centrifuges at the drilling site by improving the concentration of the solids stream during settling.

Further, in horizontal settling tank systems, solids accumulate in the initial settling compartment more rapidly than in each subsequent settling compartment. Moreover, the initial settling tank will generally accumulate larger, heavier solids that settle easily from the fluid, while the final compartment will generally accumulate finer solid particles, at a slower rate. Thus, solids should generally be emptied from the initial compartment more frequently than from subsequent compartments. Such selective solids removal is not possible using the solids conveying means of current horizontal settling tank systems.

SUMMARY OF THE INVENTION

It is an object of the present invention to obviate or mitigate at least one disadvantage of previous fluid clarification systems. In a first aspect of the invention, there is provided a fluid clarification system comprising one or more settling compartments, each settling compartment comprising: at least three walls; a base; and a solids outlet formed within the base, the base having inclined surfaces for guiding settled solids to the solids outlet.

In an embodiment, each inclined surface extends towards the solids outlet at an angle from about 5 to about 60 degrees below horizontal. The walls of the compartments may also be inclined, for example, narrowing towards the base. The walls may be inclined between about 45 and about 90 degrees below horizontal. In some embodiments, each wall may be continuous with a base surface, with both inclined at the same angle. The base may include a plurality of surfaces, with some inclined, and some vertical and/or horizontal.

In a further embodiment, the system further comprises a clear fluid compartment continuous with the settling compartments for collecting clarified overflow fluid therefrom. The clear fluid compartment may be formed within the settling tank or may be external to the tank. If the clear fluid well is formed within the tank, the clear well is defined by at least one tank outer wall and at least one weir wall, as will be described below.

In a embodiment particularly suitable for transport of the system, the settling compartments are formed within a settling tank divided into said compartments by placement of one or more weir walls within the tank such that the at least three walls of each compartment include at least one tank outer wall and at least one weir wall. The settling tank may be further divided to form a clear well continuous with the settling compartments for collecting clarified overflow fluid therefrom, the clear well defined by at least two tank outer walls and at least one weir wall. In a suitable embodiment, the weir walls extend from one tank side wall to the opposing tank side wall.

To facilitate a weir-like flow of fluid through the system, the weir wall between each successive settling compartment may be reduced in height from the previous weir wall so as to direct overflow fluid to through the settling compartments in succession. In a suitable embodiment, the tank is divided by weir walls into three consecutive settling compartments and a clear fluid well.

In a further embodiment, solids from each settling compartment are directed through the respective solids outlet to a solids disposal system, which may include a centrifuge. A pump may be provided for pumping settled solids from each settling tank. The solids may be pumped through a common conduit to the solids disposal system, or each solids outlet may be associated with a separate pump. The pumps may be controlled independently or together. The system may further include a control system for operating the pump(s) as needed, for example based on the weight and/or volume of solids in the tank.

Still further, the system may further include a flocculant reaction trough positioned above, within, or otherwise contiguous with the first settling compartment, for delivering inflow feed and flocculating agent to the settling tank. The trough preferably includes baffles to promote mixing of slurry with flocculant. The baffles may be placed at an angle from 5 to 90 degrees from the direction of flow, and are fixed to the trough sides or bottom. The baffles may extend past the trough midline. The trough may be sloped towards the compartment inlet.

In a further embodiment, a flocculant hydration and delivery system is provided for delivering flocculant to the reaction trough and to the solids stream collected from the solids outlets prior to further processing or centrifuging. The delivery system may further include a control system for regulating the rate of flocculant delivery to the flow trough.

In another embodiment, the system is of a size, shape, and weight suitable for transport upon a skid or trailer, by road, air, water, or off-road vehicle.

In a second aspect of the invention, there is provided a transportable clarifying system comprising a skid of suitable size for transport; and one or more settling compartments for mounting on the skid, each settling compartment defined by at least three walls and a base, the base having inclined surfaces for guiding settled solids to a solids outlet.

In an embodiment of the invention, the skid is of suitable size for transport by one or more of the following means: road, air, rail, water, or off road vehicle transport.

In a further embodiment, the system further comprises a solids removal system, wherein the solids removal system includes one or more pumps located on the skid beneath the inclined surface of one or more settling tanks. One or more conduits for delivering pumped solids to a solids disposal system may also be present.

In a third aspect of the invention, there is provided a method for separating solids from a fluid stream comprising the steps of directing a fluid stream into a first settling compartment, the settling compartment comprising a base having inclined surfaces for guiding settled solids to a solids outlet; directing clarified overflow fluid out of the first settling compartment over a weir wall; and periodically removing solids from the first settling compartment through the solids outlet.

In an embodiment, the method further comprises the step of adding flocculating agent to the fluid stream prior to directing the fluid stream into the first settling compartment.

In a specific embodiment, the flocculating agent is added to the fluid stream as the fluid stream passes through a flocculant reaction trough, the trough having baffles to promote mixing of the fluid stream with the flocculating agent.

The method may further comprise the step of directing the overflow from the first settling compartment into a second settling compartment to settle further solids from the fluid stream.

In an embodiment, the settling compartment comprises at least three walls, and the inclined surface of the base may extend towards the solids outlet at an angle from about 5 to about 60 degrees below horizontal.

In a fourth aspect of the invention, there is provided an apparatus for use in clarifying drilling fluids, the apparatus comprising one or more settling compartments; each settling compartment defined by at least three walls and a base, the base having inclined surfaces converging about a solids outlet for guiding settled solids to the solids outlet.

In an embodiment of this aspect of the invention, the inclined surfaces extend toward the solids outlet at an angle between about 5 and about 60 degrees below horizontal. Further, the compartment walls may be inclined, for example to narrow the compartment toward the compartment base.

In another embodiment, the apparatus comprises a clear fluid compartment continuous with the settling compartments for collecting clarified overflow fluid therefrom.

In an embodiment suitable for transport on a skid or trailer, the settling compartments are formed within a settling tank divided into said compartments by placement of one or more weir walls within the tank such that the at least three walls of each compartment include at least one tank outer wall and at least one weir wall.

In a suitable embodiment, the weir wall between each successive settling compartment is reduced in height from the previous weir wall so as to direct overflow fluid through the settling compartments in succession. One or more of the weir walls may be notched, angled, or have one or more horizontally protruding weir plates to reduce the loading rate of the weir wall.

BRIEF DESCRIPTION OF THE DRAWINGS

Embodiments of the present invention will now be described, by way of example only, with reference to the attached Figures, wherein:

FIG. 6B is a side cross-sectional view of the polymer reaction tank shown in FIG. 6.

DETAILED DESCRIPTION

Generally, the present invention provides a method and system for clarifying fluids, particularly for clarifying drilling slurries.

Figure 1:
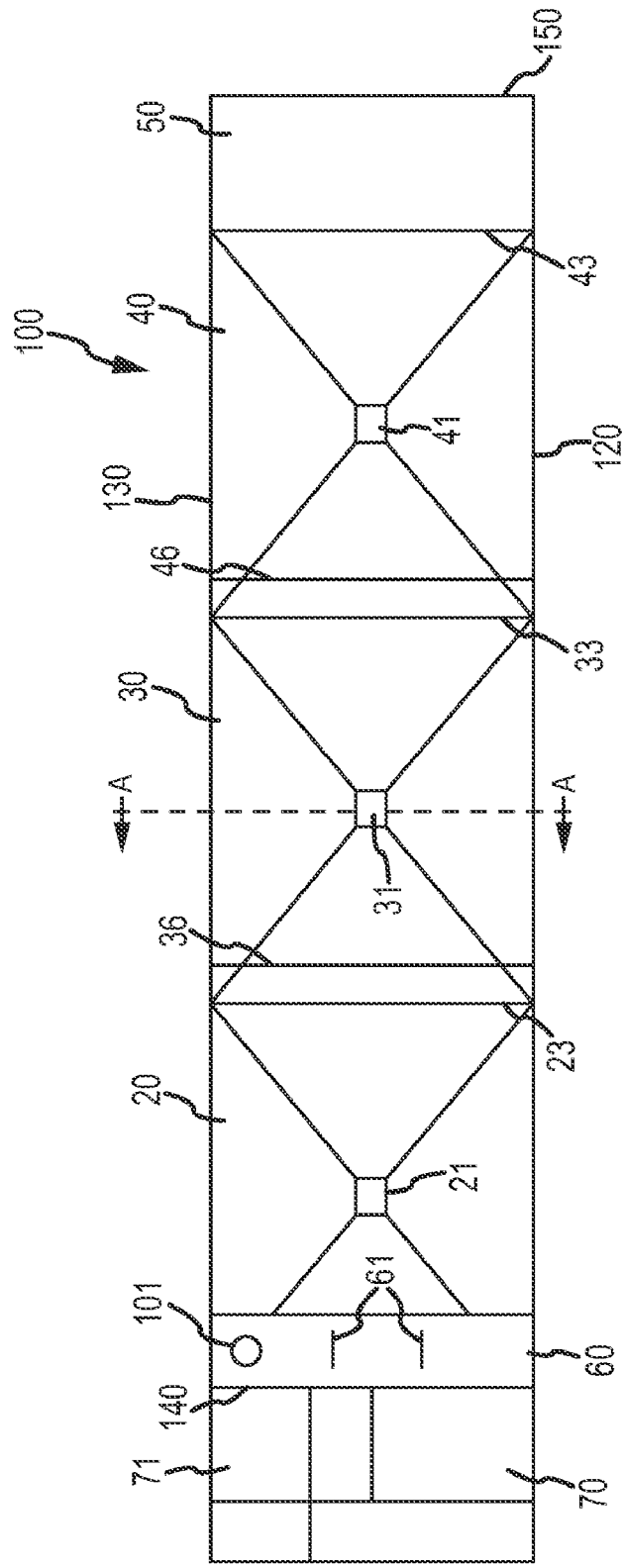
FIG. 1 is a top schematic view of a horizontal settling tank in accordance with an embodiment of the invention.
Figure 2:
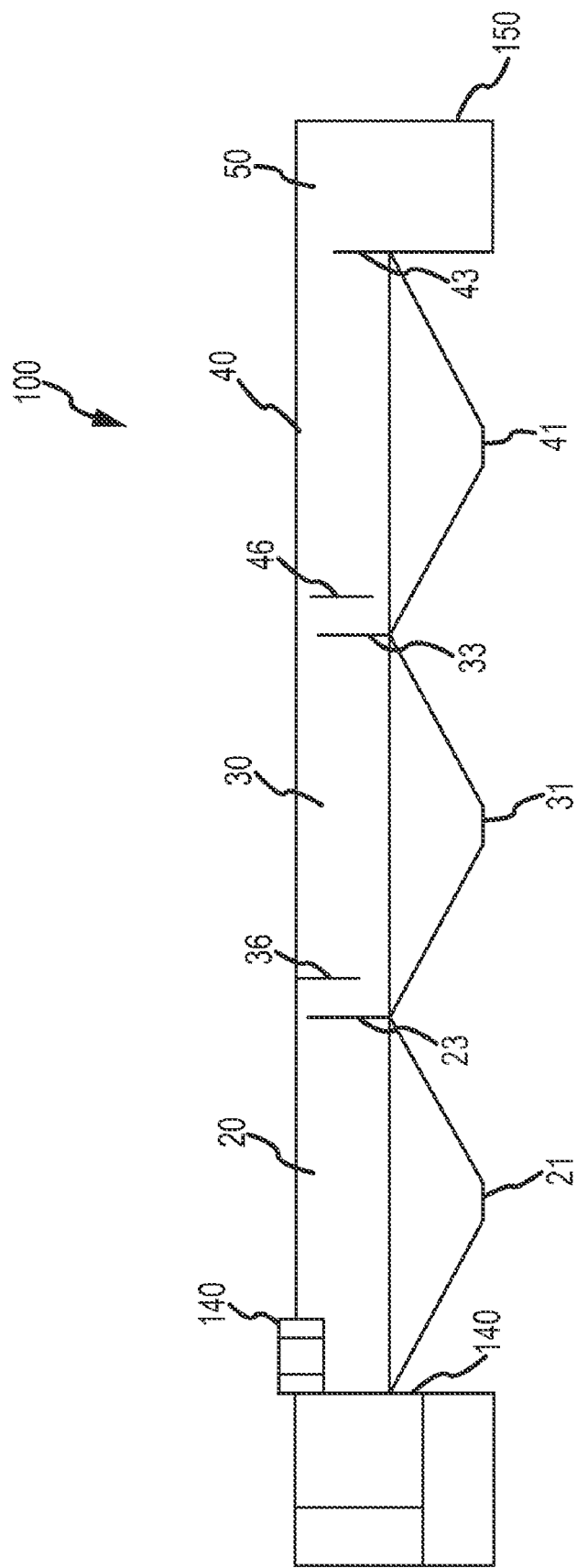
FIG. 2 is a side cross-sectional schematic view of the tank shown in FIG. 1.

With reference to FIGS. 1 and 2, in one embodiment of the invention, a horizontal settling tank 100 is provided that is divided into compartments. Slurry feed enters the tank at inlet 101, and passes through tank settling compartments 20, 30, and 40, to clarified fluid tank 50. Solids fall from the slurry in each tank settling compartment 20, 30, and 40 and concentrate at the solids outlets 21, 31, and 41 of each respective compartment. Solids may be removed through each solids outlet as necessary to maintain the desired clarity of fluid within clarified fluid tank 50. Tank compartments 20, 30, 40, and 50 are separated from one another by weir and baffle systems such that fluid flows from tank inlet 101 to the clarified fluid tank 50 as described below. The number of settling compartments may be varied from system to system as necessary. For example, in drilling operations in which large solids as well as fine solids are suspended in the slurry, a long flowpath may be required to achieve sufficient separation. Alternatively, if only large, agglomerated solids are present, a tank with only one compartment may be suitable to achieve sufficient fluid clarity.

Figure 5A:
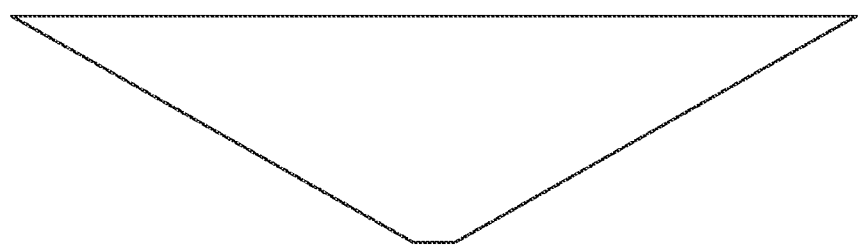
FIG. 5A is a top view of a tapered panel for use in assembling a compartment base in accordance with an embodiment of the invention.

The system may include a flow line trough 60 as shown in FIGS. 5 and 6, having baffles 61 to promote mixing of flocculating agent with the slurry feed. The baffles 61 provide some turbulence within the flow to promote mixing, without mechanically breaking up solids that have already been agglomerated. This gentle mixing of slurry with flocculant will permit a reduction in the amount of flocculant required, conserving materials and reducing costs.

The entire clarifying system may be transported on a trailer or skid, and the volume of the tank 100 may be maximized to the skid or trailer size permitted for road transport.

Division of Tank into Compartments by Weir Walls

With reference to FIG. 1, the horizontal settling system 100 shown is formed within a tank for ease of transport. The tank, having tank side walls 120, 130, and tank end walls 140, 150, is divided into three settling compartments 20, 30, 40 and a clear fluid compartment 50 as will be described below. The height of fluid within each successive compartment 20, 30, 40, 50, is reduced from that of the previous tank such that fluid flows from inlet 101 through each of compartments 20, 30, and 40, until it reaches clear fluid compartment 50. This is accomplished by the use of weir walls 23, 33, 43 to separate each tank compartment. Base portions having inclined surfaces and a solids outlet are added or formed as part of each compartment With reference to FIG. 3, settling compartment 30 is shown in end cross section. The first settling compartment 20 is separated from the second settling compartment 30 by weir wall 23, which extends upwardly from the base of tank side walls 120, 130 to a height H that is less than the height of the tank sides. Thus, the height of the fluid contents of the first settling tank 20 will be determined by the height of the weir wall 23.

With respect to the division between the second and third settling tanks 30, 40, weir wall 33 extends from the base of the tank side walls to a height I, where I<H. Thus, the height of the fluid contents of settling tank 30 will be less than that of the first settling compartment 20, and overflow fluid from settling compartment 20 will flow over weir wall 23 into settling compartment 40.

Similarly, weir wall 43, which separates settling compartment 40 from clear fluid compartment 50, is of a height J, where J<I<H. Thus, the fluid level within settling compartment 40 is lower than that in settling compartment 30, and overflow fluid from compartment 30 will flow over weir wall 33 into settling compartment 40. Overflow from settling tank 40 similarly flows over weir wall 43 into the clear fluid compartment 50 as discussed below.

Alternatively, rather than using weir walls 23, 33, 43, having heights H, I, J, one may wish to use weir walls of similar height to the tank walls, with a portion of each weir wall notched to an appropriate depth to create the weir-like flow of overflow fluid from one settling compartment to the next. For example, the notched portions of the weir walls would be of height H, I, J.

Weir Loading

In water treatment systems generally, it is desirable to reduce weir loading rates in order to reduce hydraulic gradients and minimize turbulence within the system. In the present system, turbulence within the settling tanks should be minimized to avoid breaking up agglomerated solids and resuspending particulates within the fluid. Suitable methods for reducing weir loading rates include, for example, the use of notched weir walls or attachment of one or more horizontally protruding weir plates to the weir wall. Both of these methods effectively increase the length of the weir in relation to the amount of fluid flowing over the weir. It is understood that weir loading rates should generally be maintained between 125 $m^3$/day/m and 4000 $m^3$/day/m. In the present system, it is anticipated that weir loading rates of between 125 $m^3$/day/m and 1000 $m^3$/day/m would be preferable.

Alternate Settling Tank Configurations

Many possible configurations of settling compartments may be designed in accordance with the invention, as weir walls may be placed in any suitable configuration within the tank 100 to customize the shape, size, and arrangement of the settling compartments. For example, in certain circumstances it may be desirable to reduce the number of settling compartments to one or two compartments by using fewer weir walls; or to increase the number of settling compartments, in which case additional weir walls may be added to form various compartment shapes and flow paths. Moreover, the compartments may be constructed of any suitable shape by adding baffles, tank walls, or weir walls as needed.

Specifically, in some circumstances a longer flowpath may be desirable to increase the retention time of the fluid within the system, promoting further settling of solids. Rather than transporting additional settling compartments to the site, a longer flowpath may be achieved within the same overall system volume by creating a sinuous flowpath through the settling compartments. For example, angled or notched weir walls may be placed between the tank walls in alternating arrangement to direct flow over the first weir wall adjacent a first tank wall, while the next successive weir wall may be angled or notched in opposition to direct flow to the opposing tank wall. Alternatively, a series of triangular compartments may be created by diagonal placement of the weir walls within the tank, thereby creating a sinuous flowpath. Various additional means for creating such a flowpath are possible and will be understood by those skilled in the art upon reading the present disclosure.

In addition to construction of the present system by dividing a settling tank into compartments, it is conceived that a system in accordance with the invention may be composed of one or a series of individually constructed settling compartments, with the overflow from each tank fed into a successive compartment by adjacent placement of the compartments, or by use of a conduit system between the compartments. In such arrangement, an overflow trough may be placed adjacent the weir wall of the settling compartment to collect overflow and deliver it to the next compartment.

Compartment Baffles

Figure 3:
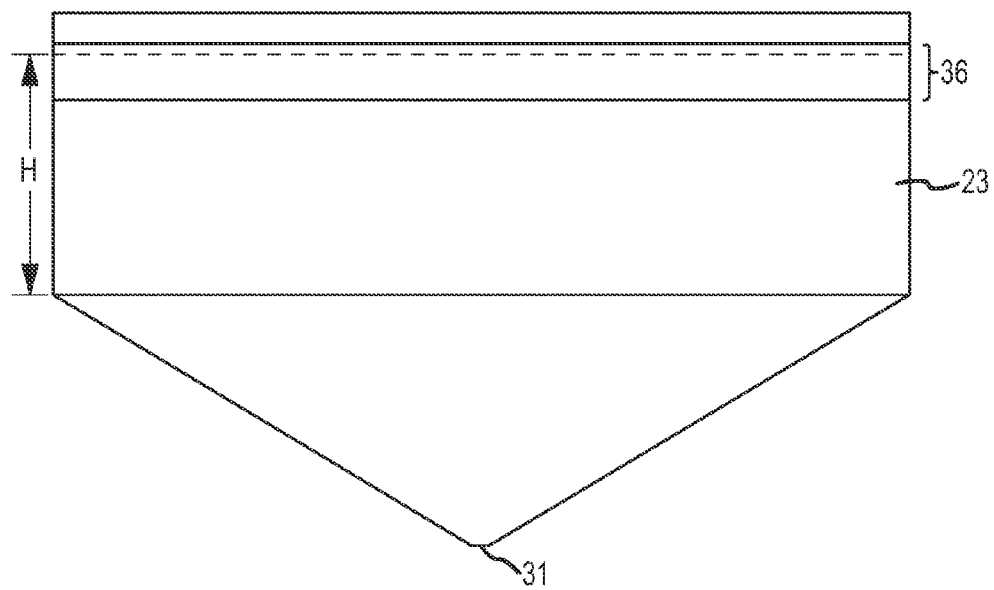
FIG. 3 is a cross-sectional schematic view of a single settling compartment in accordance with an embodiment of the invention taken across line A-A in FIG. 1.
Figure 4:
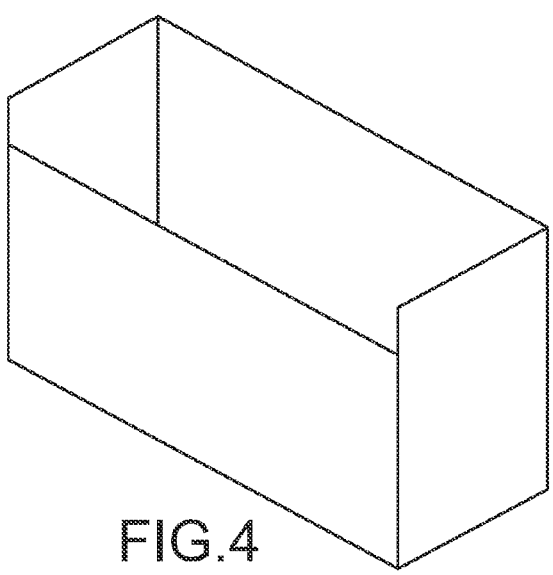
FIG. 4 is a perspective view of a clear well in accordance with an embodiment of the invention.

In addition to the weir walls 23, 33, and 43, baffles may be placed within each compartment to reduce turbulence caused by inflow of fluid to each compartment, and to enhance the settling characteristics of the system. As shown in FIGS. 1 through 3, baffles 26, 36, 46 are placed within each settling compartment. The baffles are preferably lengths of steel that are welded to the tank sides 120, 130, and extend from a height slightly above the top of the weir walls to a depth significantly below the top of the weir walls. For most applications, it is preferable that the baffles are placed between 50 mm to 1000 mm from the respective weir wall, however some experimentation may be required to determine the optimum baffle size and placement for a given slurry composition and flow rate.

Clear Well

Once fluid has passed through the three settling compartments 20, 30, 40, and solid has settled from the slurry, the resulting clarified fluid will enter clarified fluid compartment 50, which is associated with a sump for returning the fluid to the drilling operation. The sump should be operated appropriately to ensure that the fluid level in clear well 50 is maintained at a height lower than that of the adjacent settling compartment to prevent fluid backup into the settling compartments.

It should be understood that the clear well need not be a compartment within the horizontal settling tank, in which case the overflow from the final settling tank may be collected by alternate means. For example, the clear well may simply be a conduit continuous with the uppermost portion of the final settling compartment. This configuration is particularly preferable when a greater number of settling compartments or a longer flowpath is required to adequately settle solids from the slurry, as the clear well in such case would not take up valuable transportable volume (eg. skid space), which would thus be available for use in clarification.

Conversely, the horizontal settling tank may, in some circumstances, only require one settling compartment, in which case the clear well may occupy a large volume within the settling tank.

Solids Outlet

In each settling compartment, solids will fall from the slurry and collect at the bottom of the settling compartments. As shown in FIG. 2, a solids outlet 21, 31, 41, is present within each compartment 20, 30, 40, respectively, each of which is preferably associated with a pump to remove accumulated solids from the outlet. To facilitate concentration of solids at the outlet, at least a portion of the compartment bases 21, 31, 41, are inclined towards the solids outlet.

Figure 5B:
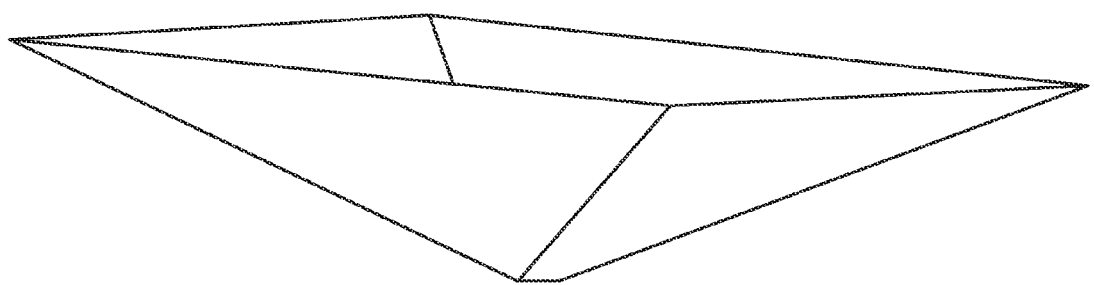
FIG. 5B is a perspective view of an assembled compartment base in accordance with an embodiment of the invention.

As shown in FIG. 5, the compartment bases are preferably assembled from four trapezoidal panels such that a central solids outlet will naturally be created once the trapezoidal panels are joined as shown in FIG. 5B to create a substantially pyramidal base. In another embodiment, the solids outlet may be cut from a previously assembled compartment base. The inverted pyramidal base shown in the Figures represents a pyramidal, conical, or hopper base configuration for the purpose of concentrating and directing solids toward the outlet. This structure has been found by the inventors to sufficiently concentrate settled solids at the outlet, facilitating independent removal from each compartment as necessary without significantly disturbing the flow of fluid and settling of solids within the compartment. Other base configurations having inclined surfaces may be suitable for concentrating and directing solids toward the outlet.

In certain circumstances it may be desirable to create a tank with compartments having more than four sides (for example having a hexagonal or octagonal shape), in which case the pyramidal bottoms would be constructed from an appropriate number of inclined bottom pieces.

It is also contemplated that the compartment base may be formed from one sheet of metal that is bent appropriately and welded along one or more seams for attachment to the compartment walls. In further embodiments, each compartment wall may be formed with a portion of the base, simply bent to an appropriate angle, or the entire wall and base may extend toward the solids outlet at a continuous angle. Such arrangements may improve concentration at the solids outlet, but may sacrifice necessary compartment volume in certain applications, particularly if size limitations are imposed by the desired method of transportation. It is therefore anticipated that if the tank walls are to be angled towards the solids outlet, such angle be between 45 and 90 degrees from horizontal, and that the angle of the inclined bottom portions be between 5 and 60 degrees from horizontal in order to sufficiently concentrate solids at the solids outlet.

The panels forming the compartment bottoms are designed to provide sufficient angle of incline to concentrate solids at the solids outlet, without sacrificing significant tank volume. In other words, it is preferable to provide only a minimal slope of the bottom panel sections to retain maximal tank size, thereby maximizing fluid retention time within the tank. The angle of incline of the tank base is preferably between 5 and 60 degrees from horizontal, or between 95 and 150 degrees from vertical (ie. from compartment walls).

If appropriate, the areas beneath the tank sloped portions may be used for pumps, conduits, or storage and may be closed in by access doors and panels if desired.

As stated above, solids may accumulate within each settling compartment at different rates depending on the slurry fluid composition and flow rate. Using the present system, solids may be removed independently from each compartment and handled separately if desired. Alternatively, solids may be removed from each compartment and sent to a common conduit to be handled as a solids mixture. For example, solids from the first settling compartment may be large agglomerated solids that may simply be deposited on-site without further treatment. By contrast, solids from the final settling compartment may be a flowable mixture of fine sand and fluid, which may benefit from further separation by a centrifuge. The present system permits a high degree of customization based on the characteristics of the slurry to be separated, and on the means available for disposing of solid waste.

It is preferable that the pumps associated with each solids outlet be adjustable such that solids would be removed from each compartment at a rate similar to the rate of solids accumulation in the respective compartment. This would enable a near-steady state of slurry fluid inflow, clarified fluid outflow, and solids output.

The solids outlet of each tank may also be used to empty the tank following completion of drilling. This gravity-based drainage avoids the costly transport and use of vacuum systems. Similarly, due to the sloped compartment bottoms and location of the solids outlets, the tank may be easily washed down and emptied prior to transport. As the present system minimizes the use of moving parts such as conveyor systems and rakes, emptying and washdown are further simplified.

Flocculant Reaction Trough

Figure 6A:
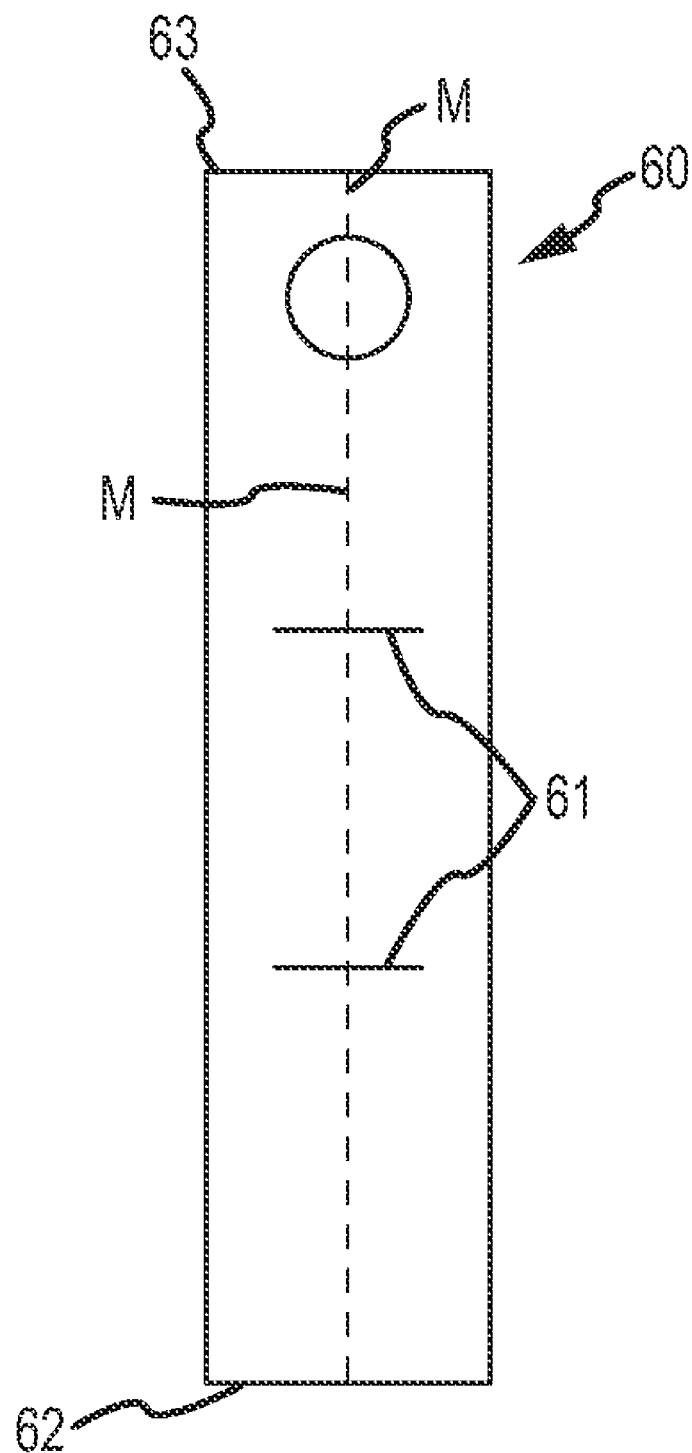
FIG. 6A is a top view of a polymer reaction tank in accordance with an embodiment of the invention.

With reference to FIGS. 6A and 6B, a flocculant reaction trough 60 is provided continuous with the first settling compartment 20. The trough includes baffles 61 to interrupt the flow of fluid and promote mixing with flocculating agent (which may be polymer, coagulant, etc.), without causing excessive turbulence that would destabilize the flocculant and break up agglomerated solids within the slurry. The gentle mixing provided by the baffles 61 in the polymer reaction trough 60 increases contact between slurry and flocculant, resulting in a reduction in the volume or concentration of polymer required.

The polymer reaction trough is preferably sloped from its inlet end 62 towards the outlet end 63, and preferably includes one or more baffles 61. The baffles are preferably generally rectangular or triangular in shape and are placed at an angle from 75 to 90 degrees to the direction of flow. As shown in FIG. 6A, the baffles are preferably centered within the trough flow stream to ensure that slurry fluid will be appropriately mixed. In an alternative baffle arrangement, baffles could extend from the trough sides past the trough midline M. Such baffles may extend into the trough at any suitable angle.

In operation, slurry is pumped into the trough at trough inlet end 62, and flocculating agent/polymer is introduced to the reaction trough at inlet end 62. The polymer stream and slurry stream flow together towards the trough outflow end 63 and are mixed by contact with the baffle system. The outflow end 63 of the trough is continuous with tank inlet 101, delivering slurry and polymer mixture to the first settling compartment 20. Inlet 101 of compartment 20, shown in FIG. 2, is extended below the trough bottom to direct slurry solids generally towards the compartment bottom, minimizing surface turbulence within the settling compartment 20. In addition, a baffle may be placed adjacent the trough to further guide slurry solids towards the bottom of the tank 20. An overflow weir is cut in the trough wall above the outlet to relieve any overflow.

As shown in FIG. 2, the reaction trough is preferably oriented horizontally and located within the first settling compartment, with polymer tanks 70, 71 placed adjacent the compartment for convenience. Alternatively, the reaction trough may be oriented vertically and placed within or adjacent the first settling tank. Many configurations of reaction troughs are possible, however the intent is to provide a vessel having baffles to interrupt the flow of fluid, promoting gentle mixing of slurry with polymer, and delivering the mixture to the first settling compartment.

Preliminary testing by the inventor has shown that a 70-80% reduction in the cost of polymer may be realized using the presently described reaction trough, due to the improved efficiency in contact between slurry and polymer. Moreover, such reduction in polymer usage will also yield corresponding cost reductions in transporting and preparing polymer for use. Accordingly, it is preferable that the concentration and/or rate of release of polymer be regulated, monitored, and adjusted as needed during operation to fully realize the efficiencies described above.

Polymer tanks 70, 71 are used to mix and add polymer to flocculate or dewater slurry as needed. For example, a first tank 70 is preferably used to hydrate polymer, while the second tank 71 stores the hydrated polymer for delivery to the polymer trough or to the centrifuge feed line, if present. Any suitable flocculant system may be used with the present system.

Transport of System

The present horizontal settling tank system may be transported to urban, rural, or remote locations by means known in the art. For example, the compact arrangement possible with the system facilitates customization for mounting upon a skid for transport by road, air-lift, rail, ship or towing behind an off-road vehicle. Due to the additional material handling efficiencies of the system, such as reduced use of polymer and greater concentration of solids, transportation costs may be further reduced.

In a preferred embodiment, a clarifying system in accordance with the invention is mounted on a skid or trailer for transport and use. Due to road limitations, such skids are generally approximately 40-53 feet long, 8.3-12 feet wide, and 5.5-7.5 feet in height. To efficiently mount the clarifying system upon the skid, while maximizing the fluid handling capabilities of the system, the system may be arranged as shown in FIGS. 1 and 2. Polymer tanks 70, 71 are located at one end of the skid, adjacent the first settling compartment 20. The polymer reaction trough 60 is placed adjacent the polymer tanks 70, 71 and over the first settling compartment 20, with outlet 101 beneath the desired fluid level of the first compartment such that the slurry stream enters the first compartment below the surface of the compartment contents as discussed above.

The inclined compartment bases provide additional space for accommodating pumps and conduits, and/or may be used for storage. The entire clarifying system may be mounted directly on a skid and operated atop the skid with minimal bracing, avoiding the need for hoisting the system from the skid.

In certain embodiments, the system may include adjustable levelling means—for example, vertically adjustable weirs or a skid-levelling system to allow the user to balance the flow over the weir walls as necessary.

EXAMPLE

The following example describes the general construction and testing of a system constructed in accordance with an embodiment of the invention.

A skid-mounted horizontal settling tank (11.55 m long× 2.74 m wide×1.70 m high) was divided by three weir walls into three settling compartments (3.04 m×2.74 m) and a clear fluid compartment (1.06 m×2.74 m), as shown in FIG. 1. A polymer hydrating system (1.37 m×2.74 m) was placed adjacent the first settling compartment, and a flocculant reaction trough (1.06 m×2.74 m) was placed within the first settling compartment as shown. The base of each settling compartment was created by joining four triangular panels into an inverted pyramid, with a solids outlet cut from the lowermost portion of one of the triangular panels. Once assembled, the base was 0.88 m high, and was attached to the walls at a depth of 0.82 m from the top of the tank. The triangular panels extending from the tank side walls were inclined towards the solids outlet at an angle of approximately 32.5 degrees below horizontal, while the triangular panels extending from the weir walls were inclined towards the solids outlet at an angle of approximately 30 degrees below horizontal.

A steel pipe was cut at and angle and attached to each solids outlet to extend from the compartment base perpendicular to the skid. Each such pipe was further connected to a solids discharge system. Upon pumping of solids from each compartment, flocculant was added and the solids stream was further separated by centrifuge.

The weir walls used in the present system were constructed to depths of approximately 0.1 m, 0.2 m, and 0.3 m from the top of the tank, and were not angled, notched, or otherwise customized to reduce the weir loading rate. Two baffles were placed within the system, one within the second settling compartment adjacent the first weir wall, and one in the third settling compartment adjacent the second weir wall. Baffles were spaced apart from the weir walls by approximately 0.3 m. Each baffle was approximately 0.5 m in height and extended across the width of the compartment.

In operation, the system was tested up to 1.8 m³/min for approximately 3 days of operation. Weir loading rates were calculated to be between 780 m³/day/m and 950 m³/day/m. It was found during testing that the majority of settling took place within the first settling compartment, and the solids stream removed from the system was sufficiently concentrated that processing by a single centrifuge with a processing rate of approximately 0.8-1.0 m³/min should be possible.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for concentrating and removing solids from a slurry stream, the method comprising the steps of:
    (a) providing two or more settling compartments for sequential passage of fluid; each settling compartment defined by at least three substantially vertical compartment walls and a pyramidal base formed of at least three panels extending from a lower edge of each compartment wall and converging about a single, central solids outlet, for gravimetrically discharging solids from the pyramidal base, wherein the settling compartments are formed within a settling tank divided into said compartments by placement of one or more weir walls within the tank such that the at least three walls of each compartment comprise at least one tank outer wall and at least one weir wall, each weir wall extending across the tank and reduced in height from the tank outer walls so as to direct fluid over the weir wall and into a successive compartment, and further wherein one of the settling compartments comprises a baffle extending between opposing vertical compartment walls of said at least three vertical compartment walls, and said baffle being positioned adjacent a preceding weir wall to minimize turbulence of fluid entering the compartment, said baffle having a lower edge terminating above the lower edges of the opposing vertical compartment walls;
    (b) directing a slurry stream into a first settling compartment, wherein each of the three panels define an inclined surface extending from each compartment wall towards the solids outlet;
    (c) directing clarified overflow fluid out of the first settling compartment over a weir wall of the first settling compartment into a second settling compartment; and
    (d) periodically removing solids from the first settling compartment through the solids outlet based on the rate of accumulation of concentrated solids over the solids outlet.

2. The method as in claim 1 further comprising the step of adding flocculating agent to the fluid stream prior to directing the fluid stream into the first settling compartment.

3. The method as in claim 2 wherein the flocculating agent is added to the fluid stream as the fluid stream passes through a flocculant reaction trough, the trough having baffles to promote mixing of the fluid stream with the flocculating agent.

4. The method as in claim 1, further comprising the step of directing clarified overflow fluid from the second settling compartment over a weir wall of the second settling compartment into a clarified fluid compartment.

5. A method for slurry clarification, the method comprising the steps of:
    (a) providing two or more settling compartments for sequential passage of fluid; each settling compartment defined by at least three substantially vertical compartment walls and a pyramidal base formed of at least three panels extending from a lower edge of each compartment wall and converging about a single, central solids outlet, for gravimetrically discharging solids from the pyramidal base, wherein the settling compartments are formed within a settling tank divided into said compartments by placement of one or more weir walls within the tank such that the at least three walls of each compartment comprise at least one tank outer wall and at least one weir wall, each weir wall extending across the tank and reduced in height from the tank outer walls so as to direct fluid over the weir wall and into a successive compartment, and further wherein one of the settling compartments comprises a baffle extending between opposing vertical compartment walls of said at least three vertical compartment walls, and said baffle being positioned adjacent a preceding weir wall to minimize turbulence of fluid entering the compartment, said baffle having a lower edge terminating above the lower edges of the opposing vertical compartment walls;
    (b) providing a slurry stream to be clarified;
    (c) directing the slurry stream into a first settling compartment, the first settling compartment wherein each of the three panels are tapered panels thereby converging about the solids outlet so as to form the pyramidal base of decreasing horizontal cross sectional area towards the solids outlet;
    (d) directing overflow fluid from the first settling compartment over a weir wall of the first settling compartment into a second settling compartment; and
    (e) pumping solids from the solids outlet in the first settling compartment based on a rate of accumulation of concentrated solids over the solids outlet.

6. The method as in claim 5, further comprising the step of monitoring a composition of the first settling tank contents.

7. The method as in claim 5, further comprising the step of detecting the presence of concentrated solids over the solids outlet.

8. The method as in claim 5, further comprising the steps of:
    directing clarified overflow fluid from the second settling compartment over a weir wall of the second settling compartment; and
    pumping solids from the solids outlet of the second settling compartment based on a rate of collection of concentrated solids over the solids outlet.

9. The method as in claim 5, further comprising adding flocculant to the slurry stream prior to directing the slurry stream into the first settling compartment.

10. The method as in claim 5, further comprising the step of mixing the slurry stream with flocculant prior to directing the slurry stream into the first settling compartment.

11. The method as in claim 10, wherein the step of mixing comprises passing the slurry stream and flocculant through a flocculant reaction trough prior to directing the slurry stream to the first settling compartment.

12. The method as in claim 5, wherein the weir wall provides a weir loading rate of less than 1000 L/min/m.

13. The method as in claim 5, wherein slurry is introduced at a rate sufficient to operate the method with a linear flow rate greater than 1.6 m/min.

14. A method for concentrating and removing solids from slurry stream, the method comprising the steps of:
    (a) providing two or more settling compartments for sequential passage of the slurry stream, each settling compartment comprising at least three substantially vertical compartment walls, each wall having upper, lower, and side edges, each wall joined along its side edges to an adjacent wall to form a compartment having a first horizontal cross sectional area defined by the lower edges of each joined compartment wall; and a compartment base comprising a solids outlet having an opening within the compartment base for gravimetrically discharging solids from the compartment base; and at least three tapered panels, each panel attached to the lower edge of each compartment wall, and joined to an adjacent panel, the tapered panels thereby converging about the opening so as to form a generally inverted pyramidal shape for the compartment base of decreasing horizontal cross sectional area towards the outlet, wherein the settling compartments are formed within a settling tank divided into said compartments by placement of one or more weir walls within the tank such that the at least three walls of each compartment comprise at least one tank outer wall and at least one weir wall, each weir wall extending across the tank and reduced in height from the tank outer walls so as to direct fluid over the weir wall and into a successive compartment, and further wherein one of the settling compartments comprises a baffle extending between opposing vertical compartment walls of said at least three vertical compartment walls, and said baffle being positioned adjacent a preceding weir wall to minimize turbulence of fluid entering the compartment, said baffle having a lower edge terminating above the lower edges of the opposing vertical compartment walls;

(b) directing the slurry stream into a first settling compartment for settling solids from the slurry stream;

(c) directing clarified overflow fluid out of the first settling compartment over a weir wall of the first settling compartment into a second settling compartment; and (d) periodically removing solids from the first settling compartment through the solids outlet based on a rate of accumulation of concentrated solids over the solids outlet.

15. A method as in claim 14, wherein periodically removing solids is achieved by pumping.

* * * * *